UNITED STATES PATENT OFFICE.

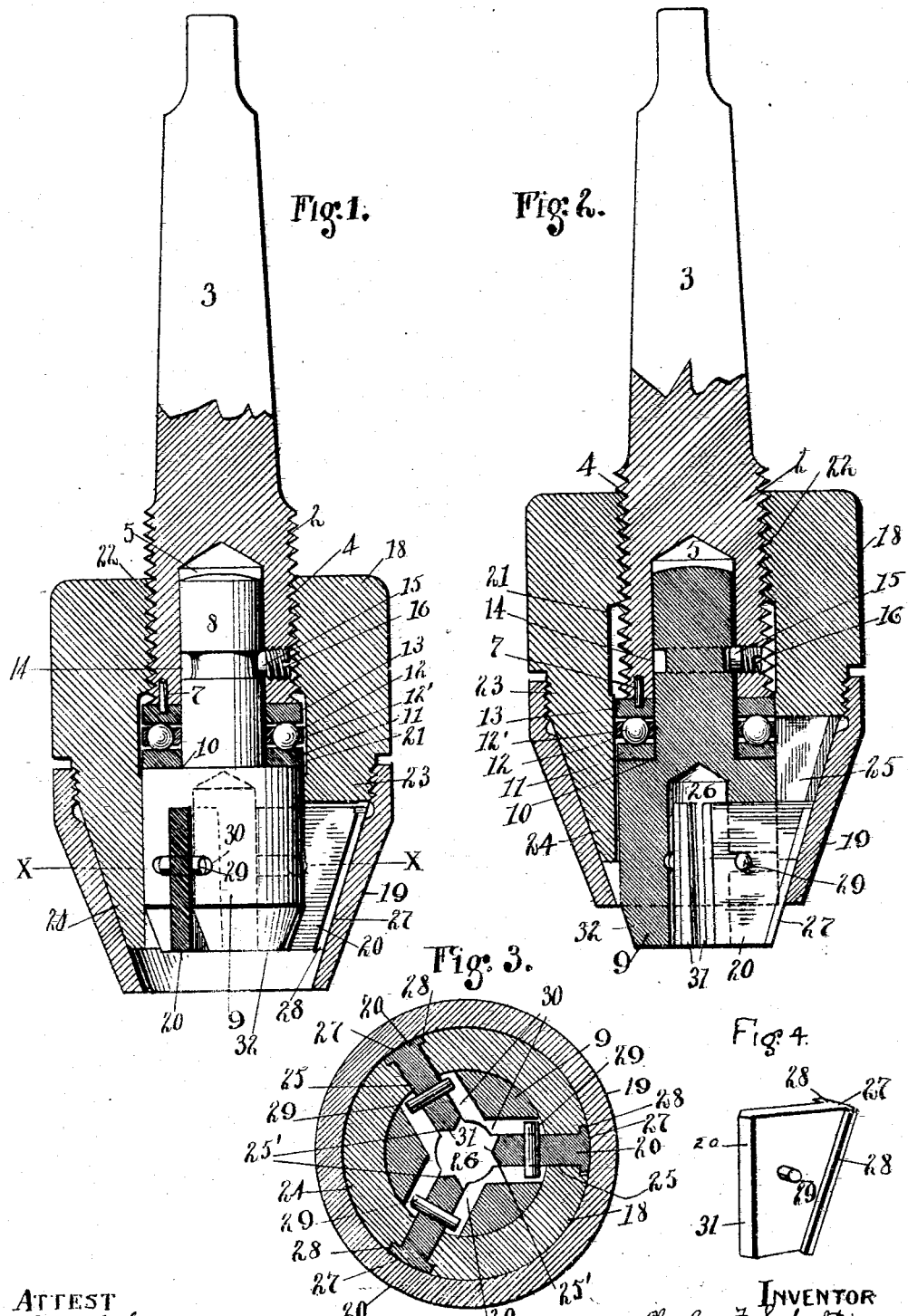

CHARLES F. SCHULTIS, OF LAKEWOOD, OHIO, ASSIGNOR TO THE CLEVELAND COLLET AND MACHINE COMPANY, OF CLEVELAND, OHIO, A CORPORATION OF OHIO.

DRILL-CHUCK.

939,102.      Specification of Letters Patent.      Patented Nov. 2, 1909.

Application filed January 7, 1909. Serial No. 471,067.

*To all whom it may concern:*

Be it known that I, CHARLES F. SCHULTIS, a citizen of the United States, residing at Lakewood, in the county of Cuyahoga and State of Ohio, have invented certain new and useful Improvements in Drill-Chucks; and I do declare that the following is a full, clear, and exact description of the invention, which will enable others skilled in the art to which it appertains to make and use the same.

My invention relates to improvements in drill chucks, and consists of a chuck adapted to be easily set and released by hand for different sized drills or tools, all as herein shown and described and more particularly pointed out in the claim.

My improved chuck is adapted to have a wide range of adjustment and is manipulated by hand for locking and unlocking the drill or tool in the chuck. It is also constructed not to bind or become too tightly locked during operations of the tool. Otherwise, unlocking of the chuck would require means other than bare hands to release the parts. Nevertheless, to be effective it is desirable to retain the self locking effect within controllable limits, and my object is to provide a chuck wherein both self locking and hand release may be obtained, as well as to provide a chuck having a large range of adjustment to hold different sized drills or like rotatable tools.

In the accompanying drawings, Figure 1 is a sectional view longitudinally of the drill chuck showing the collet in side elevation and with the jaws retired or in open position, and Fig. 2 is a substantially similar view but showing the parts in their relatively changed positions as when the jaws are carried to about the limit of their innermost positions for the smallest sizes of drills and the like. Fig. 3 is a cross section of Fig. 1 on line x—x thereof, and Fig. 4 is a perspective view of one of the gripping jaws.

The drill chuck comprises holder or body 2 having the usual tapered shank 3 adapted to be placed within and held by the usual rotative means employed in the various kinds and makes of machines found in general use. Body 2 is externally threaded, and preferably coarsely threaded, although not extremely so, say ten pitch U. S. standard, and this thread —4— is shown as extending the full length of the straight portion of body 2, but obviously it need not extend the full length. Body 2 is also provided with a central bore 5 at its bottom wherein reduced extension 8 of collet 9 is supported. The main body of this so-called collet member is of substantially the same diameter as body 2, and shoulder 10 at the base of reduced extension 8 seats a tool steel hardened washer 11 which is pressed tightly over said extension. A series of steel anti-friction balls 12 within a follower ring 12′ rest upon washer 10 and a second steel washer 13 lies upon said balls and bears against the bottom end of body 2 and is pinned thereto by pin 7 to prevent independent rotation, and said parts take the extreme thrust of the drill when at work although it must be understood that the collet does not rotate independently of body 2 at this time.

Collet 9 rotates independently of body 2 only when the tool is not locked therein as in making adjustments. When the tool is in place the parts are jointly locked for common rotation. Extension 8 has an annular groove 14 about the same wherein rounded end 15 of screw 16 is adapted to extend to prevent separation of said parts, except when said screw is retired or removed from its opening in the side of body 2.

The means for locking the tool in the collet and also locking the collet against rotation upon holder 2 when the tool is held therein comprise a rotatable hand sleeve 18 and its tapered sleeve ring 19, combined with slidable jaws 20 mounted in both the collet 9 and sleeve 18. Thus, sleeve 18 has a central through opening approximately equal in size to the diameter of body 2 and the collet, except where slightly enlarged as at 21 to permit freedom of working between the parts. A threaded portion 22 within the top end of sleeve 18 provides working engagement with thread 4 on body 2 and wherewith sleeve 18 and its ring 19 is moved axially over the collet when the sleeve is rotated.

A reduced portion 23 midway of sleeve 18 is screw-threaded for ring 19 and the lower extremity 24 of sleeve 18 from threaded portion 23 downward is cone shaped or tapering to snugly fit within the internal taper of ring 19, the angle of which is approximately eighteen degrees. Extremity 24 is slotted on radial lines as represented by 25, Figs. 2 and 3, and collet 9 is likewise provided with slots 25' on the same radial lines, and the gripping jaws 20 are of the same length as said slots and seated therein their full length for transverse slidable movement therein. The shank of the tool (not shown) is adapted to seat within central bore 26 in the bottom end of the collet member and the jaws 20 are adjusted and set in respect thereto by the rotary and axial movement of the sleeve and ring which either crowd the jaws inward or move them outward dependent upon the direction of rotation of said parts. Thus, each jaw has an inclined face 27 which bears against the inner inclined face of ring 19 to thrust the jaws inward, and also inclined ribs 28 which seat within rabbets or grooves in sleeve 18 to carry the jaws outward. The jaws have a combined transverse and axial movement within slots 25 of sleeve 18, but only a transverse movement in the collet slots, being otherwise fixed in respect thereto by pins or lugs 29 which ride in the cross grooves 30 in the collet at either side of the radial slots therein, see Fig. 3. These pins also prevent the jaws from dropping out of the collet.

The gripping face or surface 31 of the jaws is of any preferred shape or form, but in order that the tool be held firmly and in true alinement with the axis of the holder, the jaws 20 are proportionately of greater length than width. Now to obtain the maximum adjustment for the holder, especially for the small sizes, I find it necessary to bevel or cut away the collet at its lower end 32 so as not to obstruct inward movement of the jaws by their ribs 28, see Fig. 2 where the jaws are set for about the smallest sized tool. To lock a tool in the chuck, sleeve 18 is rotated by hand and moves up on body 2, thereby forcing the jaws into gripping relation with the shank of the tool in the socket 26 of the collet. Both the sleeve and collet and also the jaws rotate in this operation, but when the tool is gripped by the jaws further rotation by hand is checked. However, when the holder and tool and all the parts are at work, the tendency is to still rotate the parts in the same direction as in setting operations and therefore, the parts become locked still tighter, all of which is of advantage in more securely holding the tool. In this self locking of the parts the end thrust of collet 9 in respect to body 2 is taken up by anti-friction balls 12. Therethrough, the thrust upon thread 4 is minimized and made sensitive to hand control and will not become so self-locked or tightly bound that the hand alone cannot release the drill by reversely rotating the sleeve.

Briefly, though the construction of the chuck tends to tightly lock the tool in the collet and the collet on the holder, still the release of the drill or tool may be instantly and easily obtained by gripping and rotating the sleeve with the bare hand.

Removal of ring 19 from sleeve 18 permits access to the interior of the device to remove or replace the jaws if desired. In operation, said ring 19 forces the jaws inward when sleeve 18 moves upwardly on body 2 and holds them in any adjusted position and against outward movement.

What I claim is:

A drill chuck comprising a threaded body having a slotted hand sleeve engaged therewith, a slotted collet rotatably mounted upon said body, jaws slidably engaged and carried by said sleeve and collet and confined their full length within the collet to sustain torsional strains thereon, and a tapering ring removably mounted upon said sleeve to engage said jaws.

In testimony whereof I affix my signature in presence of two witnesses.

CHARLES F. SCHULTIS.

Witnesses:
R. B. MOSER,
E. M. FISHER.